(12) United States Patent
Morgan et al.

(10) Patent No.: US 9,085,360 B2
(45) Date of Patent: Jul. 21, 2015

(54) ACTUATOR

(75) Inventors: Antony Morgan, Wolverhampton (GB); John H. Harvey, Wolverhampton (GB)

(73) Assignee: GOODRICH ACTUATION SYSTEMS LIMITED (GB)

( * ) Notice: Subject to any disclaimer, the term of this patent is extended or adjusted under 35 U.S.C. 154(b) by 414 days.

(21) Appl. No.: 13/479,682

(22) Filed: May 24, 2012

(65) Prior Publication Data

US 2012/0304788 A1 Dec. 6, 2012

(30) Foreign Application Priority Data

May 26, 2011 (GB) .................................. 1108876.2
Jan. 24, 2012 (GB) .................................. 1201083.1

(51) Int. Cl.
| | |
|---|---|
| *B62D 5/22* | (2006.01) |
| *F16H 55/26* | (2006.01) |
| *B64C 25/50* | (2006.01) |
| *F16H 25/20* | (2006.01) |
| *B62D 5/04* | (2006.01) |

(52) U.S. Cl.
CPC ............ *B64C 25/50* (2013.01); *F16H 25/2021* (2013.01); *B62D 5/0445* (2013.01); *B62D 5/22* (2013.01); *F16H 55/26* (2013.01); *F16H 2025/204* (2013.01); *F16H 2025/2078* (2013.01); *Y10T 74/18576* (2015.01); *Y10T 74/18728* (2015.01)

(58) Field of Classification Search
CPC .......... B62D 5/04; B62D 5/0421; B62D 5/22; B62D 5/0445; Y10T 74/18576; Y10T 74/18728; F16H 55/26; F16H 2025/204; F16H 2025/2078

USPC .................................. 74/399 PS, 425; 280/90
See application file for complete search history.

(56) References Cited

U.S. PATENT DOCUMENTS

| | | | | |
|---|---|---|---|---|
| 2,749,161 | A | * | 6/1956 | Latzen .......................... 403/138 |
| 3,099,424 | A | | 7/1963 | Hrusch |
| 3,995,502 | A | * | 12/1976 | Jones ............................. 74/18.2 |
| 4,634,135 | A | * | 1/1987 | Nakata et al. ................... 280/90 |

FOREIGN PATENT DOCUMENTS

| | | |
|---|---|---|
| DE | 100 11 140 | 11/2000 |
| DE | 202008001576 U1 | 3/2008 |
| DE | 10 2007 018 919 | 10/2008 |
| EP | 1 548 327 | 6/2005 |
| EP | 1548327 | 6/2005 |
| JP | 5-58310 | * 3/1993 |
| JP | 2010-241258 | * 10/2010 |

OTHER PUBLICATIONS

European Search Report dated Nov. 20, 2012.
DE Office Action for Application No. 12 250 113.3-1752, Mailed on Jun. 16, 2014. 6 pages.

* cited by examiner

*Primary Examiner* — William C Joyce
(74) *Attorney, Agent, or Firm* — Cantor Colburn LLP

(57) ABSTRACT

An actuator comprises a rotatable nut arranged to be driven for rotation by a motor, an axially translatable shaft cooperable with the nut and arranged such that rotation of the nut drives the shaft for axial movement, and a steering rack coupled to the shaft by a coupling arrangement so as to be driven for axial movement by the shaft, wherein the coupling accommodates limited relative lateral movement between the shaft and the steering rack.

11 Claims, 4 Drawing Sheets

Fully to the left

Fully to the right

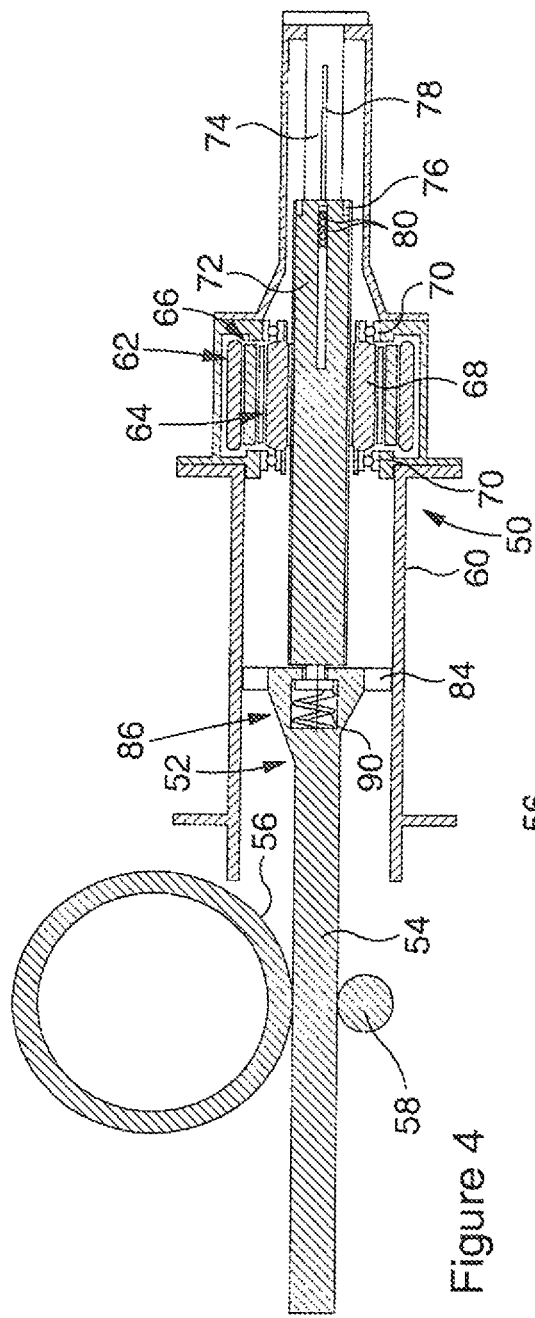
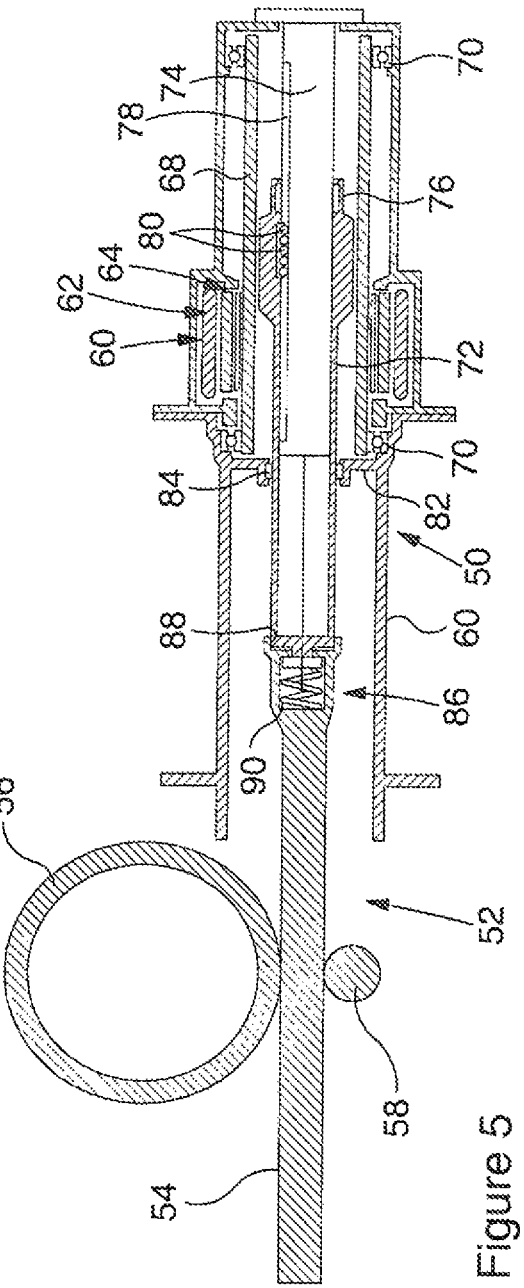
Figure 4
Figure 5

ACTUATOR

TECHNICAL FIELD

This invention relates to an actuator, and in particular to a linear actuator suitable for use in aerospace applications. For example, it may be used in the steering of an aircraft nose-wheel.

BACKGROUND

One form of linear actuator used in aerospace applications comprises a threaded screw shaft which is supported in such a manner as to be axially moveable whilst held against significant angular motion. A rotatable nut cooperates with the screw shaft in such a manner that rotation of the nut drives the screw shaft for axial movement. Conveniently, a ball-screw type coupling is provided between the nut and the screw shaft so as to reduce frictional losses within the actuator. The nut is conveniently arranged to be driven for rotation by an associated electrically powered motor.

Linear actuators are used in a wide range of aerospace related applications. For example they are used to drive thrust reverser components, variable area fan nozzle components, under carriage components and the like for movement between stowed and deployed positions.

Increasingly there is a desire to use electrically driven linear actuators in applications in which, traditionally, it has been usual to use hydraulically driven actuators. One such application is in adjusting the angle of the nose wheel of an aircraft in order to steer the aircraft whilst it is moving along the ground at relatively low speed.

A typical nose-wheel steering arrangement includes an axially translatable toothed rack, the teeth of which are cooperable with the teeth of a toothed pinion formation provided upon a support shaft associated with the nose-wheel. Axial movement of the rack drives the pinion, and hence the shaft, for angular movement, thus adjusting the orientation of the nose-wheel to effect steering. The rack is typically hydraulically driven.

As mentioned above, there is a desire to use electrically powered actuators in such applications. One way in which an electrically powered actuator can be used in controlling nose-wheel steering is to use an electric motor driven linear actuator to drive the rack of an arrangement of the type described hereinbefore for translating movement. For example, the actuator may comprise a rotatable, but axially fixed, threaded nut arranged to be driven for rotation by the electric motor, the nut cooperating with an axially moveable, non-rotating shaft by way of a ball-screw or similar low friction coupling.

There is a risk that the reaction forces experienced by the rack as a result of its cooperation with the pinion could result in significant side loadings being transmitted to the shaft of the actuator as the cooperation between the rack and the pinion results in the rack experiencing significant reaction loadings in directions angled to the longitudinal axis of the rack. The application of such loadings could result in increased wear or damage to the actuator which, clearly, is undesirable.

Whilst electrically driven linear actuators of the type described hereinbefore are capable of applying appropriately high axial forces to allow their use in a wide range of aerospace applications, they may be subject to increased levels of wear where significant side loadings are applied thereto, in use, such as where used to drive the rack of a nose wheel steering arrangement. In order to avoid the application of such side loadings, the support of the steering rack may be enhanced to permit reaction of the side loadings to an associated support. However, this may result in increased weight, and may also require the use of a more powerful actuator to overcome, for example, increased frictional loadings.

EP1548327 describes an electrically powered actuator of the general type described hereinbefore and in which the screw shaft is carried upon a support, a roller arrangement being provided between the screw shaft and the support to allow the screw shaft to move axially along the support but to substantially prevent angular movement therebetween.

It is an object of the invention to provide an actuator arrangement suitable for use in applications in which significant side loadings may be experienced, for example in nose wheel steering applications.

SUMMARY

According to one aspect of the invention there is provided an actuator, for example a nose-wheel steering actuator, comprising a rotatable nut arranged to be driven for rotation by a motor, an axially translatable shaft cooperable with the nut and arranged such that rotation of the nut drives the shaft for axial movement, and a steering rack coupled to the shaft by a coupling arrangement so as to be driven for axial movement by the shaft, wherein the coupling accommodates limited relative lateral movement between the shaft and the steering rack.

By accommodating such relative lateral movement, the risk of the transmission of side loadings to the shaft, and consequent risk of damage to the actuator, is reduced.

Preferably, the coupling comprises a torsion shaft interconnecting the rack and the shaft. The torsion shaft preferably interconnects the shaft with an end of the rack remote from the shaft. Conveniently, the torsion shaft extends within at least a part of the rack.

The coupling may conveniently be arranged to permit limited angular movement between the steering rack and the shaft. The coupling is conveniently spring biased so as to be of substantially zero back-lash form.

The end of the rack remote from the shaft is conveniently supported for axial movement by a housing.

Damper means, for example magnetic damper means, may be provided to damp any rapid oscillations occurring in the rotary movement of the nut as a result of rapid fluctuations in the axial movement of the shaft and rack, which in turn results from any shimmying motion occurring during nose-wheel steering. A break-out arrangement may be provided to disengage the damper means, for example in the event of failure or jamming thereof.

The nut and shaft are conveniently housed within a housing. The housing conveniently includes a telescoping part moveable between a retracted position and an extended position. The telescoping housing part is conveniently biased towards its retracted position, only moving away from the retracted position when the shaft moves towards the end of its range of movement in one direction. Accordingly, the space occupied by the nose-wheel steering actuator, when not in use, can be reduced.

According to another aspect of the invention there is provided an actuator comprising an axially movable screw shaft, movable relative to a support housing, a rotatable nut which is held against axial movement relative to the support housing, the nut and shaft cooperating with one another in such a manner that rotation of the nut drives the shaft for axial movement relative to the support housing, a support carrying the shaft for axial movement, the support being coupled to the shaft by a non-rotatable coupling to restrain the shaft against angular movement relative to the support, a first bearing arrangement between the shaft and the support, and a second bearing arrangement serving to react applied side loadings to the housing.

The first bearing may serve to hold a first end of the shaft concentric with the support.

Such an arrangement is advantageous in that side loadings are reacted to the support and support housing, thereby avoiding or reducing the application of such side loadings to the interface between the shaft and the nut and so reducing the risk of increased wear and/or damage thereto.

The second bearing may be located between the support housing and an adjacent part of the shaft. In such an arrangement, the second bearing comprises a sliding bearing. It will be appreciated that, in such an arrangement, loadings applied to the shaft are reacted to the support housing, and so the risk of increased wear and/or damage is reduced.

In an alternative configuration, the second bearing may be interposed between the support housing and a part of a component secured to the shaft. In such an arrangement, at least part of a side loading applied to the said component is reacted to the support housing rather than to the shaft, and so the risk of increased wear and/or damage is reduced.

Conveniently, the support is provided with an elongate groove within which ball or roller elements carried by the shaft are located, the groove and ball or roller elements together forming the non-rotatable coupling. It will be appreciated that, in use, the ball or roller elements are able to move along the groove and so, although angular movement of the shaft is resisted, axial movement thereof is not impeded by the presence of the non-rotatable coupling.

The shaft is conveniently coupled, at one end thereof, to a steering rack. The nature of the coupling between the shaft and the steering rack may be such that relative lateral movement between the shaft and the steering rack is not permitted. In such an arrangement, a side loading applied to the steering rack will typically be transmitted via the coupling to the shaft, and so the second bearing arrangement will normally be required to react the applied side loading from the shaft to the support housing. Alternatively, in accordance with the first aspect of the invention, the coupling may be such that relative lateral movement between the steering rack and the shaft is permitted. In such an arrangement, side loadings applied to the steering rack may be reacted to the support housing by the second bearing arrangement, the permitted lateral movement allowing the shaft to occupy a position in which it is coaxial with the support and in which substantially no side loadings are applied to the interface between the shaft and the nut. In both of these arrangements, the coupling is conveniently arranged to permit limited angular movement between the steering rack and the shaft.

The coupling is conveniently spring biased so as to be of substantially zero back-lash form.

The invention further relates to a nose wheel steering arrangement incorporating such an actuator.

BRIEF DESCRIPTION OF THE DRAWINGS

The invention will further be described, by way of example, with reference to the accompanying drawings, in which:

FIG. 4 is a view illustrating an actuator in accordance with a second embodiment of the invention; and FIG. 5 illustrates a further alternative embodiment.

DETAILED DESCRIPTION

Figure 1:
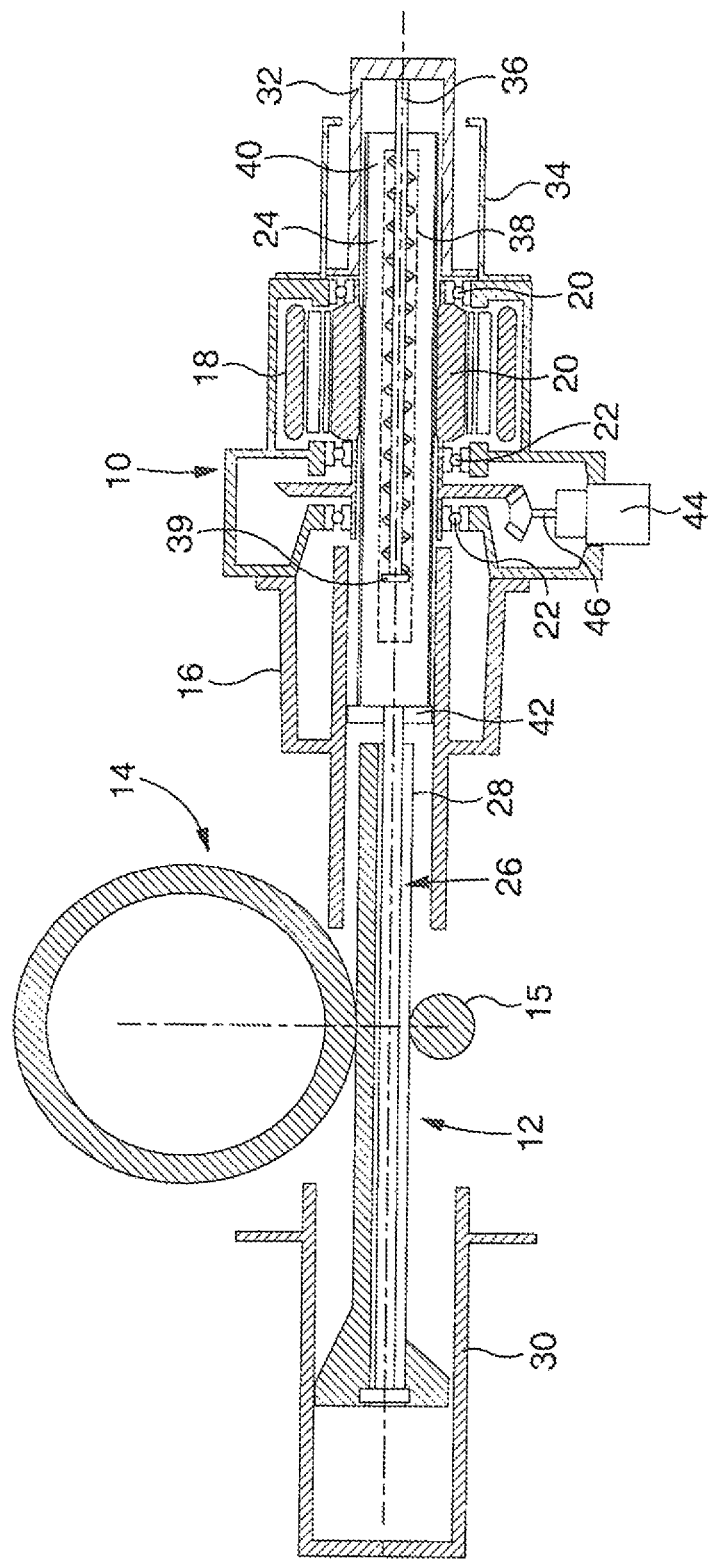
FIG. 1 is a diagrammatic sectional view illustrating the nose-wheel steering actuator of an embodiment of the invention in a mid stroke position.
Figure 2:
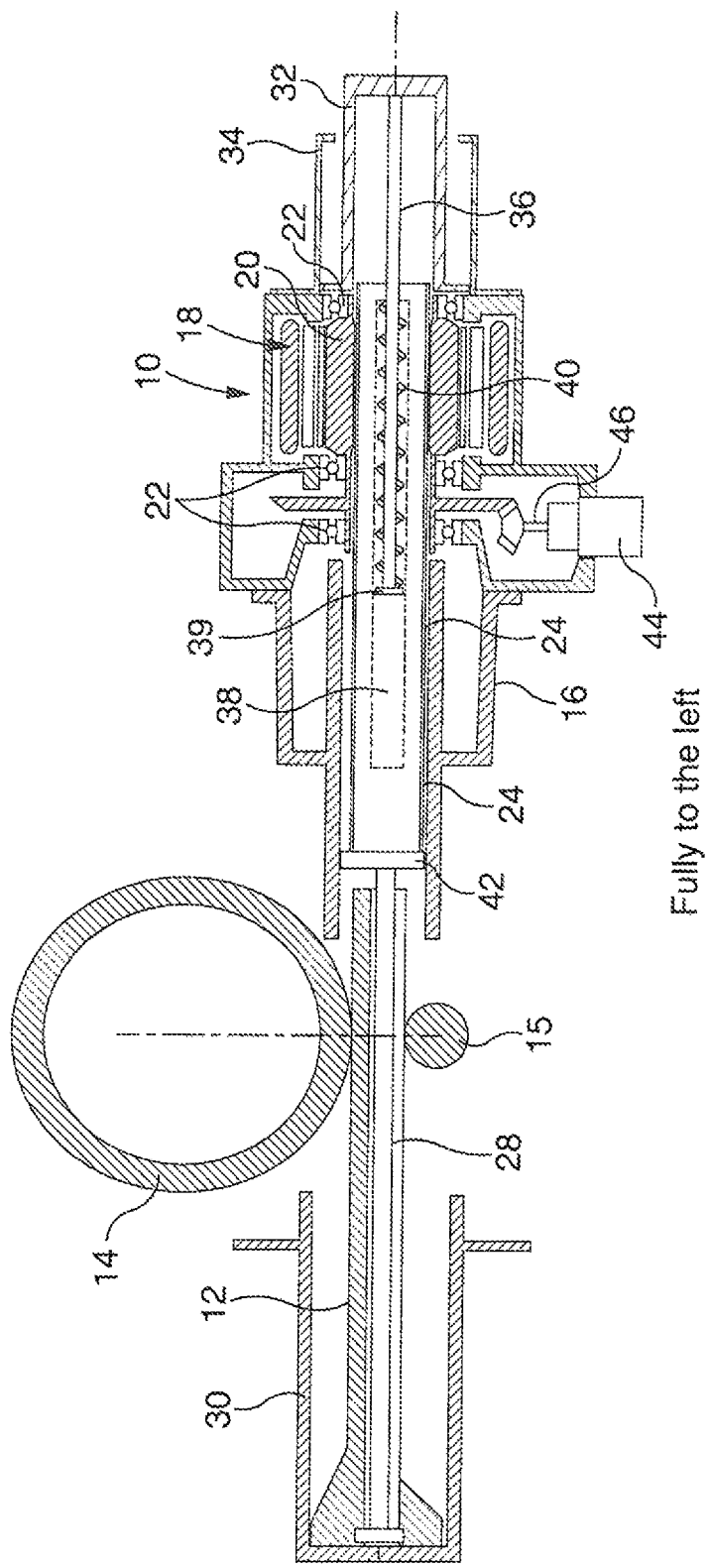
FIGS. 2 and 3 are views similar to FIG. 1 illustrating the actuator in its extreme positions.
Figure 3:
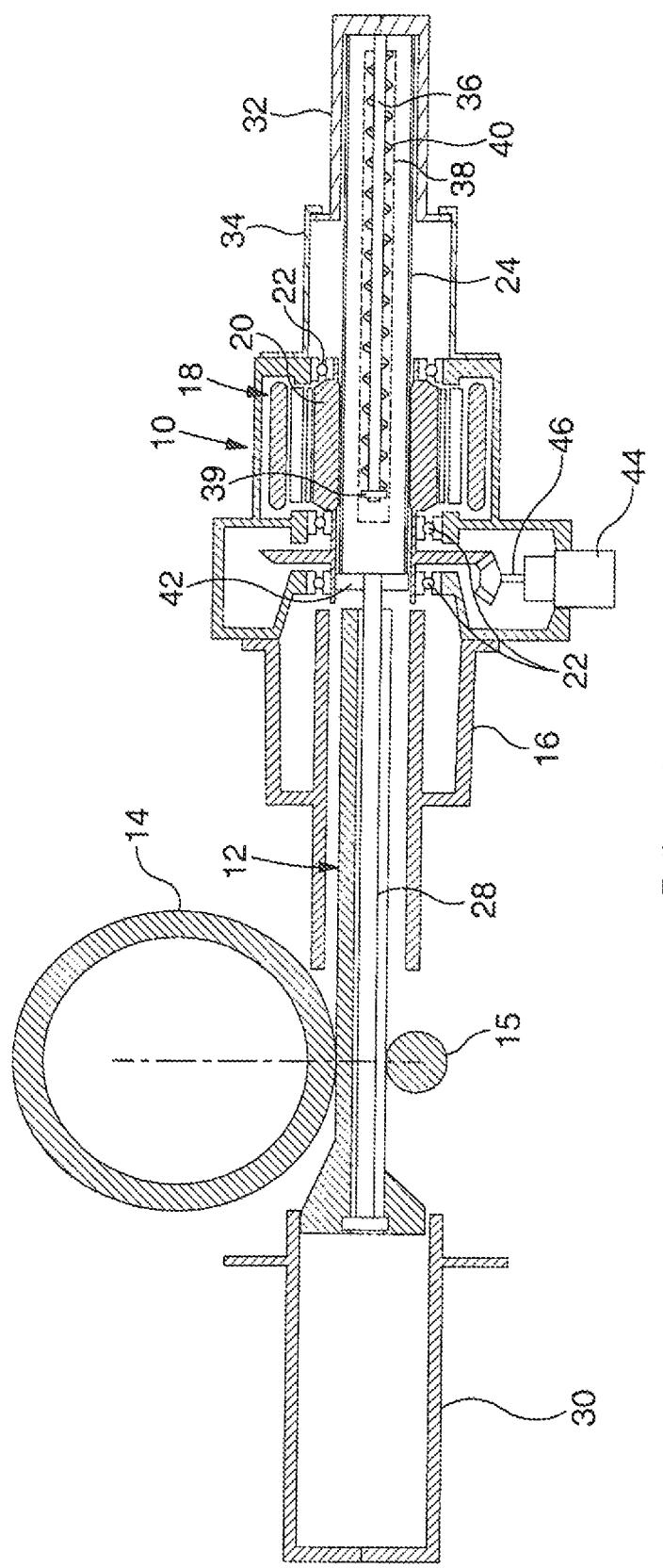

Referring first to FIGS. 1 to 3 of the accompanying drawings, a nose-wheel steering actuator system is shown which comprises an electric motor driven nose-wheel steering actuator 10 operable to drive a steering rack 12 for axial movement. The steering rack 12 includes teeth (not shown) which cooperate with teeth (also not shown) of a pinion 14 secured to or forming part of an angularly moveable support shaft carrying a nose-wheel. An idler roller 15 bears against the opposite side of the rack 12 from the pinion 14, supporting the rack 12 and ensuring that cooperation between the teeth of the rack 12 and the pinion 14 is maintained. The cooperation between the rack 12, pinion 14 and idler roller 15 prevents rotation of the rack 12 about its axis.

The actuator 10 comprises a multi-part housing 16 containing the stator and rotor of an electrically powered and controlled motor 18. The rotor of the motor 18 is secured to a nut 20 supported for rotation within the housing 16 by bearings 22. The bearings 22 allow the nut 20 to rotate relatively freely within the housing 16, but are arranged to restrict or prevent axial movement of the nut 20 relative to the housing 16.

The nut 20 is threaded and cooperates via a ball-screw type coupling with a shaft 24. It is recognised that the coupling between the nut 20 and the shaft 24 could alternatively take the form of a known roller-screw or ACME-screw type coupling depending upon the axial and radial loads being transmitted through the nose-wheel steering actuator system, in use. As described below, the shaft 24 is held against angular movement, but is free to move axially relative to the housing 16. Accordingly, in use, rotation of the nut 20 by the operation of the motor 18 drives the shaft 24 for axial movement relative to the housing 16.

The shaft 24 is coupled to the rack 12 by a coupling 26 designed to accommodate limited relative lateral movement between the ends thereof. In the arrangement illustrated, the coupling 26 takes the form of a torsion shaft 28 connected to the shaft 24, extending along substantially the full length of the rack 12, and coupled to the rack 12 at its end remote from the shaft 24. The nature of the coupling of the torsion shaft 28 to both the rack 12 and the shaft 24 is such that relative angular movement therebetween is not permitted. Accordingly, as the rack 12 is held against rotation about its axis by virtue of its cooperation with the pinion 14 and the idler roller 15, the coupling between rack 12 and the shaft 24 ensures that the shaft 24 is also held against rotation. Whilst serving to hold the shaft 24 against rotation, flexing of the torsion shaft 28 allows limited lateral and angular displacement of the rack 12 relative to the shaft 24 to be accommodated without resulting in the application of significant side loadings to the shaft 24.

The torsion shaft 28 is conveniently of relatively small diameter, and thus exhibits a reasonable level of flexibility. By locating the torsion shaft 28 within the rack 12, for example within a passage or channel formed therein, flexing of the torsion shaft 28 as a result of the application of lateral loads thereto is limited, despite the torsion shaft 28 being of relatively small diameter. The presence of the idler roller 15 further serves to restrict such flexing. The compliance of the torsion shaft 28, resulting from its relatively small diameter and long length, further has the advantage that the transmission of shock loadings between the rack 12 and the shaft 24, such as could occur in the event of an aircraft landing when the associated nose-wheel tyre is deflated, is reduced.

As illustrated, the end of the rack 12 remote from the shaft 24 is of enlarged diameter and is located within and supported by a housing 30. Additional support for the rack 12 is thus provided.

The actuator housing 16 is designed to include a telescopically mounted housing part 32 held captive to the remainder of the housing 16 by a retainer 34. The telescopically mounted housing part 32 encloses an end part of the shaft 24 remote from the rack 12, and is moveable between a retracted position (shown in FIGS. 1 and 2) which it occupies when the actuator is in a mid-stroke position (FIG. 1), or between the mid-stroke position and a left-hand extreme position (FIG. 2), and an extended position (see FIG. 3) occupied when the actuator is in an extreme right-hand position. As shown, the part 32 carries a rod 36 which extends into a passage 38 formed in the shaft 24. A spring 40 cooperates between a head 39 at the end of the rod 36 furthest from the housing part 32 and an end of the passage 38 closest to the housing part 32 to apply a biasing load to the rod 36, and hence to the housing part 32, urging the housing part 32 towards the retracted position. As the actuator moves from the mid-stroke position (FIG. 1) towards the right hand extreme position (FIG. 3), it will be appreciated that the right-hand end of the shaft 24 will move into contact with the housing part 32, continued movement of the shaft 24 pushing the housing part 32 towards the extended position. Upon return movement of the shaft 24 occurring, the spring 40 serves to ensure that the housing part 32 returns back towards its retracted position. Such an arrangement is advantageous in that, in use, in most positions of the actuator the housing 16 can be of relatively small dimensions. Accommodation of the actuator, when stowed, can thus be simplified.

Whilst the arrangement shown includes just one telescopically mounted housing part 32, a multistage telescopic arrangement could be provided if desired, thereby permitting functionality to be maintained in the unlikely event of seizure of one of the parts thereof.

It will be appreciated that the presence of the housing part 32 closes one end of the housing 16, restricting the ingress of debris. A seal 42 is conveniently provided between the housing 16 and the end of the shaft 24 closest to the rack 12 to further restrict the ingress of debris. As a result, the housing 16 is fully sealed and so wear of the actuator can be minimised. The seal 42 need only be a sliding seal as lateral movement of the end of the shaft 24 should not occur. Accordingly, the reliability of this seal should be such that minimal maintenance of the actuator will be required.

As illustrated, the actuator incorporates a damper 44, for example in the form of a magnetic damper, driven from a geared extension to the nut 20. The damper 44 serves to damp any rapid oscillations occurring in the rotary movement of the nut 20, as a result of rapid fluctuations in the axial movement of the shaft 24 and rack 12, which in turn results from any shimmying motion occurring during nose-wheel steering. A break-out device 46, for example in the form of a shearable region, is conveniently provided so that, in the unlikely event of a jam or failure within the damper 44, the remainder of the actuator can continue to operate. Whilst the provision of a shearable region is one solution, the break-out device could take other forms, for example it could be achieved by way of limited torque interference fits or by a coupling in which drive components in the form of balls or rollers are normally located within detents or pockets, but are able to escape therefrom if the applied torque becomes excessive.

In use, starting from the position shown in FIG. 1, it will be appreciated that operation of the motor in one rotary direction will drive the shaft 24 and rack 12 to the left, towards the position shown in FIG. 2, whilst rotation in the opposite direction will move the rack 12 toward the position shown in FIG. 3. Regardless as to the direction of movement, the reaction loads experienced by the rack 12 as a result of the forces applied thereto by the shaft 24 and the engagement thereof with the pinion 14 will be borne by the idler roller 15 and the cooperation of the end of the rack 12 with the housing 30. Despite this good support, lateral or angular movement of the rack 12 may occur, and flexing of the torsion shaft 28 will accommodate any such movement without resulting in the application of significant side loadings to the shaft 24. Accordingly, little if any extra loads are applied to the ball-screw coupling between the shaft 24 and the nut 20, or to the bearing 22 by which the nut 20 is supported. The risk of additional wear to these components is thus avoided.

A number of modifications to the arrangement described hereinbefore are possible. By way of example, if desired, the damper 44 and/or telescoping housing part 32 could be omitted if, for instance, damping functionality is not required and/or the installation of the actuator does not necessitate the need for a telescoping housing.

Referring next to FIG. 4 there is illustrated an electrically powered linear actuator 50 operable to drive a component 52 for axial movement. In the arrangement shown the component 52 takes the form of a toothed steering rack 54, the teeth of which are able to cooperate with the teeth of a rotatable or angularly moveable pinion 56 secured, in use, or forming part of, a support shaft of an aircraft nose wheel assembly. As illustrated, a support roller 58 is located adjacent the point at which the steering rack 54 bears against the pinion 56, the support roller 58 reacting at least part of the loadings arising from the cooperation between the pinion 56 and the steering rack 54. Whilst the support roller 58 reacts some of the applied loadings, the nature of the geared cooperation between the pinion 56 and the steering rack 54 is such that the steering rack 54 will experience a reaction loading urging it to tilt, with the result that the ends thereof will be urged to undertake a substantially lateral movement.

The actuator 50 comprises a support housing 60 of multi-part form. The housing 60 contains the stator 62 and rotor 64 of an electrically driven motor 66, the rotor 64 being rigidly secured to a nut 68 that is supported for rotation within the housing by bearings 70. The bearings 70, whilst permitting rotation of the nut 68, prevent or significantly restrict axial movement of the nut 68.

The nut 68 is internally threaded, the threads cooperating via a ball-screw type coupling with the external threads of a screw shaft 72. As shown in FIG. 4, the nut 68 is of relatively long axial length compared to the axial length of the part of the shaft 72 provided with the external thread formation. In use, the cooperation between the nut 68 and the shaft 72 is such that rotation of the nut 68 drives the shaft 72 for axial movement relative to the support housing 60. During such movement, it will be appreciated that the threaded part of the shaft 72 translates along the length of the threaded part of the nut 68.

The shaft 72 is of hollow form, and a support 74 extends within the shaft 72. The inner diameter of the shaft 72 and the outer diameter of the support 74 are such as to permit the shaft 72 to ride, axially, along the support 74. As illustrated, a first sliding bearing 76 is carried by the shaft 72 and bears against the outer surface of the support 74, the first bearing 76 serving to hold the adjacent end part of the shaft 72 concentric with the support 74, transmitting any side loads experienced by that part of the shaft 72 to the support 74.

The support 74 is formed with an elongate groove 78 into which a series of ball elements 80 carried by the shaft 72 project. It will be appreciated that the cooperation of the ball elements 80 within the groove 78 serves to resist angular movement of the shaft 72 relative to the support 74. The support 74 is rigidly secured to the support housing 60, thus the non-rotatable coupling so formed between the shaft 72 and the support 74 serves to substantially prevent angular movement of the shaft 72 relative to the support housing 60, whilst permitting axial extension and retraction thereof.

The support housing 60 includes an inwardly extending wall 82 defining an opening through which the shaft 72 projects. A second sliding bearing 84 is carried by the wall 82 and bears against the outer surface of the shaft 72, thereby reacting side loads from the shaft 72 to the support housing 60.

The steering rack 54 is secured to an end of the shaft 72 by a coupling 86. The coupling 86 is designed in such a manner as to permit angular movement of the shaft 72 relative to the steering rack 54 about the axis of the shaft 72, but to substantially prevent relative lateral movement therebetween. Such lateral movement is resisted by the formation of a socket 88 in the end of the steering rack 54 into which an end part of the shaft 72 projects, the diameter of the socket 88 and that of the end part of the shaft 72 being substantially the same. A preloaded spring 90 is located within the socket 88, applying a biasing load to the coupling 86 thereby resulting in the coupling 86 being substantially free of back-lash.

In use, operation of the motor 66 drives the nut 68 for rotation. As mentioned hereinbefore, the rotation of the nut 68 drives the shaft 72 for axial movement. The direction of axial movement depends upon the direction of rotary movement of the nut 68. The movement of the shaft 72 is transmitted through the coupling 86 to the steering rack 54 and the cooperation between the steering rack 54 and pinion 56 achieves the desired steering of the associated nose wheel. As mentioned hereinbefore, the reaction between the steering rack 54 and pinion 56 will result in the application of loadings to the steering rack 54 which are angled to the longitudinal axis thereof. The nature of the coupling 86 which does not permit relative lateral movement between the steering rack 54 and the shaft 72 transmits such loads to the shaft 72. In a typical linear actuator, such side loadings would be transmitted, at least in part, through the ball-screw coupling to the nut and could potentially result in increased wear and/or damage, shortening the working life of the actuator or increasing maintenance requirements. In accordance with the invention, the shaft 72 is supported by first and second bearings 76, 84 which serve to react the side loadings, directly or indirectly, to the support housing 60 without increasing the loading on the ball screw coupling. The risk of increased wear and/or damage is thus reduced.

Additionally, the support 74 and non-rotatable coupling formed between the shaft 72 and the support 74 serves to hold the shaft 72 in a fixed angular orientation, and the coupling 86 allows the steering rack 54 to find its own angular orientation.

The arrangement of FIG. 5 is similar to that of FIG. 4, and only the significant differences therebetween will be described herein. In the arrangement of FIG. 5, the threaded part of the nut 68 is of reduced axial length compared to the arrangement of FIG. 4, and the shaft 72 is of threaded form over an increased axial length thereof. In such an arrangement, the location of the area over which there is threaded cooperation between the shaft 72 and the nut 68 remains stationary as the actuator extends and retracts, whereas in the arrangement of FIG. 4 the location of the area over which there is threaded cooperation moves or translates within the nut as the shaft translates.

Another significant difference is that in the arrangement of FIG. 5, the second sliding bearing 84 is located between the end part of the steering rack 54 and part of the support housing 60 instead of between the support housing 60 and the shaft 72. As a consequence, side loadings experienced by the steering rack 54 are reacted directly to the support housing 60 rather than being transmitted to the shaft 72. As the side loadings are reacted directly to the support housing 60, there is no need for the coupling 86 to be designed to transmit side loadings to the shaft 72, indeed this would be undesirable in this embodiment. Consequently, the coupling 76 is not formed with a socket into which an end part of the shaft 72 is fitted. Rather, the end of the shaft 72 bears against the end of the steering rack 54, and the coupling 86 permits limited lateral movement to occur therebetween, in accordance with the first aspect of the invention. The coupling 86 allows relative angular movement to occur as in the arrangement of FIG. 4.

In use, extension and retraction of the actuator 50 occurs in substantially the manner described hereinbefore. Side loadings experienced by the steering rack 54 are reacted direct to the support housing 60, rather than being transmitted to the shaft 72. The shaft 72 is thus able to find its own axis of rotation, the interface between the nut 68 and the shaft 72 experiencing little if any side loads and so the risk of wear and/or damage thereto is reduced. The cooperation between the shaft 72 and the support 74 serves to resist angular movement of the shaft 72.

Whilst specific embodiments of the invention are described hereinbefore it will be appreciated that a wide range of modifications and alterations may be made thereto without departing from the invention. For example, the damper of the arrangement of FIG. 1 could be incorporated into the embodiments of FIGS. 4 and 5, and the bearings and support of the arrangements of FIGS. 4 and 5 could, if desired, be incorporated into the arrangement of FIG. 1. These are, however, merely examples of possible alterations.

Although the invention is described herein with reference to a nose wheel steering application, it will be appreciated that the invention may also be used in other applications in which it is desired to avoid the transmission of side loadings to the interface between a shaft and a nut of an actuator.

The invention claimed is:

1. An actuator comprising a rotatable nut arranged to be driven for rotation by a motor, an axially translatable shaft cooperable with the nut and arranged such that rotation of the nut drives the shaft for axial movement, and a steering rack coupled to the shaft by a coupling arrangement so as to be driven for axial movement by the shaft, wherein the coupling accommodates limited relative lateral movement between the shaft and the steering rack;
   wherein the coupling comprises a torsion shaft interconnecting the rack and the shaft and
   wherein the torsion shaft interconnects the shaft with an end of the rack remote from the shaft.

2. An actuator according to claim 1, wherein the torsion shaft extends within at least a part of the rack.

3. An actuator according to claim 1, wherein the coupling is arranged to permit limited angular movement between the steering rack and the shaft.

4. An actuator according to claim 1, wherein the coupling is spring biased so as to be of substantially zero back-lash form.

5. An actuator according to claim 1, wherein the end of the rack remote from the shaft is supported for axial movement by a housing.

6. An actuator according to claim 1, further comprising damper means to damp any rapid oscillations occurring in the rotary movement of the nut as a result of rapid fluctuations in the axial movement of the shaft and rack, which in turn results from any shimmying motion occurring during nose-wheel steering.

7. An actuator according to claim 6, wherein the damper means comprise magnetic damper means.

8. An actuator according to claim 6, where a break-out arrangement is provided to disengage the damper means.

9. The actuator according to claim 1,
   wherein the nut and shaft are housed within a housing, and the housing includes a telescoping part moveable between a refracted position and an extended position.

10. An actuator according to claim 9, wherein the telescoping housing part is biased towards its retracted position, only moving away from the retracted position when the shaft moves towards the end of its range of movement in one direction.

11. A nose wheel steering arrangement incorporating an actuator According to claim 1.

* * * * *